A. H. KNAPP & G. W. BAILEY.

BAILEY Assignor to KNAPP.

CURTAIN-FIXTURES.

No. 7,308. Reissued Sept. 12, 1876.

WITNESSES

E. M. Gallaher.

D. P. Powl

INVENTORS,

A. Haydn Knapp,

George W. Bailey,

By J. S. Brown, Attorney

N. PETERS, PHOTO-LITHOGRAPHER, WASHINGTON, D. C.

UNITED STATES PATENT OFFICE.

A. HAYDN KNAPP, OF NEWTON, AND GEORGE W. BAILEY, OF LAWRENCE, MASSACHUSETTS; SAID BAILEY ASSIGNOR TO SAID KNAPP.

IMPROVEMENT IN CURTAIN-FIXTURES.

Specification forming part of Letters Patent No. 102,409, dated April 26, 1870; reissue No. 7,308, dated September 12, 1876; application filed May 23, 1876.

DIVISION B.

*To all whom it may concern:*

Be it known that A. HAYDN KNAPP, of Newton, in the county of Middlesex, and GEORGE W. BAILEY, of Lawrence, in the county of Essex, and State of Massachusetts, have invented certain Improvements in Curtain-Fixtures; and I do hereby declare that the following is a full and exact description thereof, reference being had to the accompanying drawings, making part of this specification—

Figure 1:
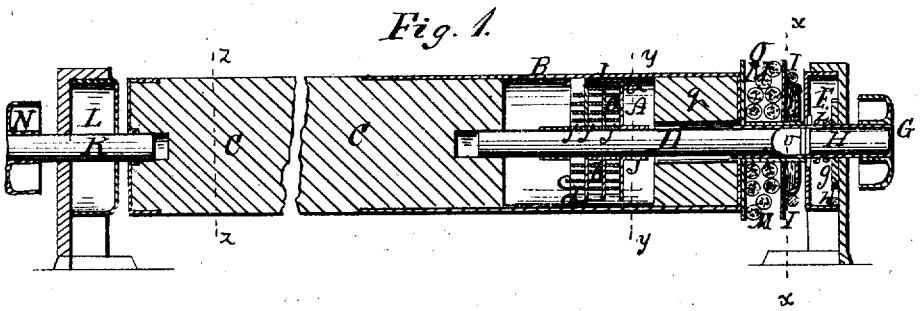
Figure 2:
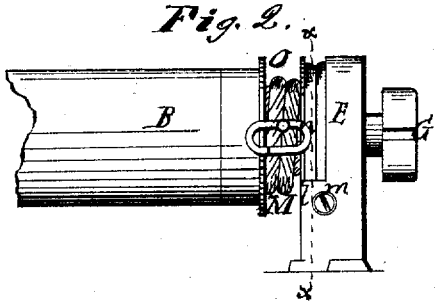
Figure 3:
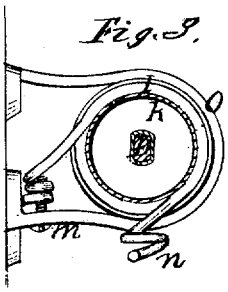
Figure 4:
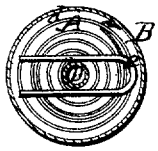
Figure 5:
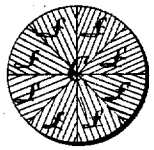

Figure 1 being a central longitudinal horizontal section of the improved curtain-roller, with other improved parts of the fixture attached thereto; Fig. 2, a view of the under side of the fixture at the right-hand or operative end of the roller; Fig. 3, a transverse section thereof in a plane indicated by the line *x x*, Figs. 1 and 2; Fig. 4, a transverse section thereof in a plane indicated by the line *y y*, Figs. 1 and 2; Fig. 5, a transverse section of the roller in a plane indicated by the line *z z*, Fig. 1.

Like letters designate corresponding parts in all of the figures.

The main object of this invention is to produce a spring-balance curtain-fixture, the spring of which, being located in a cylindrical case or chamber attached to one end, or forming a continuation of the roller, shall occupy as little length of the roller as possible, and much less than the ordinary springs for this purpose require, so that the spring-chamber shall not be injured by, nor shall interfere with, the nailing of the curtain or shade to the roller, the same as if the roller were entirely of wood and solid, and withal so that the spring shall have sufficient length to dispense with gearing for any required length of shade.

This object is accomplished by means of an improved spring, A, which forms one feature of this invention. It is a compound spring formed of separate spirals or coils united at one end of each by suitable connections. As shown in Figs. 1 and 4, the separate coils *a b c* are placed each in a cup-shaped or short cylindrical holder, *d*, so that each holder may turn with its coil separately on the spindle D; and the spring of one holder is connected with the adjacent holder, each holder having a projecting hub or tubular eye, *j*, to extend into the next holder for the purpose of receiving by attachment the inner end of the spring thereof, while the outer end of the same spring is secured to the inner periphery of its own holder. But the first spring *a* is secured at its inner end to the spindle D, while the outer end of the last spring *c* is attached to the inner periphery of the case or chamber B of the roller.

Any number of springs can be thus connected, all acting as a single spring, and the number of springs united can be increased or diminished according to the length of the entire compound spring found necessary in any case.

The different coils *a b c* might be connected as one spring, but there are practical difficulties in their combined construction and subsequent use, which render them inferior to the separate springs connected by the spring-holders *d d d*.

The ordinary spiral spring occupies most of the length of the curtain-roller, which, in such case, can not well be made of wood, and be strong and durable, and allow the shade to be nailed thereto, although wooden rollers are desirable, if solid at one end, so that they can be cut off to suit the varying widths of windows. And hollow metallic rollers require some other means of attaching the shade thereto besides tacking with nails, thereby increasing the expense of the fixture and the trouble of putting it up. But with the improved spring A, according to the invention herein described, and the stout case or chamber B, required to contain the spring, a solid wooden roller, C, can be used, occupying most of the width of the window, and the spring-chamber does not interfere with the nailing on of the shade, since its length is not greater than the ordinary distance of the nails used in tacking shades upon wooden rollers; and a short wooden block, *q*, may be secured to the outer end of the spring case or chamber, as shown in Fig. 1, so that the contiguous corner of the shade can be nailed thereto.

This invention also includes an improved construction of the wooden roller C, as indicated in Fig. 5. It is made of several strips, *f f*, joined and glued together in radial planes, or nearly so.

By this construction, the springing and crooking of the roller—faults so common with certain rollers turned from single pieces of wood—are obviated; and its cost is little, if any, greater than when rollers are made of single pieces, if convenient machinery for making such rollers is employed, for the reason that much smaller and inferior stuff answers to make them of; whereas rollers from single pieces have to be turned from the straightest-grained and best material. The strips *f f* may be made of two or more kinds of wood joined alternately, if desired.

Another feature of improvement consists in a device for adjusting the force of the spring A to properly balance the curtain. The spindle D of the spring projects from the case or chamber B, and is coupled, as at *o*, Fig. 1, to a shaft, H, solid or tubular, extending through the bracket E, and provided with a knob or head, G, to turn it by. Inside of the bracket E is a ratchet-wheel, *g*, on the shaft H, into which ratchet-wheel a detent, *h*, takes, held thereto by a spring. By means of this ratchet-wheel and detent and the knob G, the spring A is wound up at any time to any degree of force required, so as to adjust it to the weight of the curtain or shade. Thus a spring-balance fixture is produced, without gearing, of simple and cheap construction, and very convenient in use.

The knob-shaft H, as represented, is arranged to be drawn out endwise far enough to uncouple it from the spring-spindle D, there being a coiled spring, *i*, around it, inside of the bracket E, to hold it coupled to the spindle, except when the shade and roller are to be taken down.

This coupling device may be applied to the left-hand bracket L, and its pivot K and knob N, at the free end of the curtain-roller. In that case the spindle D may extend through the bracket E.

It is difficult to make springs that are precisely adapted to every varying size and weight of curtains and shades. Springs also are apt to give way and diminish in strength by use. A balance fixture to be perfectly desirable, should balance quite exactly at all times. On this account, to obviate all imperfections as far as possible in the present invention, there is combined with the balance-spring a friction-brake device, controlled by a cord, so that if the curtain or shade is not exactly balanced by the spring the brake sustains it securely, and if the spring fails to draw up the curtain or shade on lifting the weighted end thereof, the cord may be used to assist; or, as when the shade extends down, or nearly down, to the floor, and it is inconvenient to stoop to lift its lower end, the cord may be used exclusively for raising the same. For this purpose the friction-brake employed is so arranged that on pulling the cord its pressure is thereby taken from the curtain-roller, and it ceases then to act as a brake. The construction and arrangement of this friction-brake are shown in Figs. 2 and 3.

To the end of the roller C, or at one end thereof, and turning with it, is secured a cord-spool, O, and a friction-cylinder or drum, *k*, is attached thereto, or near it, as also near the bracket E, and to a suitable projection, *l*, of the bracket is attached a curved spring or spring-wire, I, by means of an adjusting-screw, *m*. This spring extends behind and upward around the drum *k*, upon the periphery of which it presses with the required force, adjustable by the said set-screw *m*. The free end of the spring projects downward in front of and partially backward under the drum, and terminates in a loop or bow, *n*, through which the cord M runs as it winds upon, or unwinds from, the drum. This loop is so situated and arranged that when pulling down on the cord for raising the shade it will draw the spring I away from contact with the drum, and relieve the same of the friction of their contact, and the brake offers no resistance to the raising of the shade; but it immediately resumes its pressure upon the drum when the cord is let go, and the loop of the spring ceases to be acted on thereby.

The loop *n* is formed by bending the end of the wire round in an open turn or turns, so that the cord can be inserted and taken out without running it endwise through the loop.

The friction-brake and cord may be used on other curtain-fixtures besides the spring-balance fixtures, and the improved balance may be used without the improved brake.

What I claim as the invention of A. HAYDN KNAPP and GEORGE W. BAILEY, and desire to secure by Letters Patent, is—

1. In combination with the roller and spindle of a curtain-fixture, a compound spring, composed of a series of separate spiral springs or coils, respectively contained in interconnecting holders, substantially as and for the purpose herein specified.

2. In combination with the balance-spring and roller of a curtain-fixture, a spindle provided with a device arranged on a shaft, H, in line with the said spindle, for adjusting the free end of the spring without taking down or disturbing the fixture, substantially as and for the purpose herein specified.

3. In combination with the roller of a curtain-fixture, a spring-brake, and spool-cord, so arranged that the simple drawing down upon the spool-cord relieves the roller of the brake, substantially as herein specified.

4. A spring-brake, I, of a curtain-roller, constructed with an open-cord loop, *n*, for inserting and withdrawing the cord without threading or unthreading the same, substantially as herein specified.

5. A curtain-roller, formed of several sections of wood, extending from center to circumference, and joined radially, substantially in the manner and for the purpose herein specified.

Witnesses: A. HAYDN KNAPP
H. W. KITRIDGE,
N. KELLEY.